(12) United States Patent
Son et al.

(10) Patent No.: US 8,916,272 B2
(45) Date of Patent: Dec. 23, 2014

(54) SURFACE PROTECTIVE FILM, METHOD FOR FABRICATING THE SAME, POUCH THEREOF AND METHOD FOR FABRICATING THE SAME

(75) Inventors: Ki Mock Son, Pajuse (KR); Jong Hak Kim, Unpyengku (KR); Young Hee Kim, Gwacheon-si (KR); Han Jun Kang, Suwon-si (KR); Hee Sik Han, Gunpo-si (KR); Sang Min Lee, Ansan-si (KR); Jong Seon Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/254,319

(22) Filed: Oct. 20, 2008

(65) Prior Publication Data

US 2009/0104467 A1 Apr. 23, 2009

(30) Foreign Application Priority Data

Oct. 19, 2007 (KR) ........................ 10-2007-0105653

(51) Int. Cl.
| | |
|---|---|
| B32B 27/32 | (2006.01) |
| B29C 47/00 | (2006.01) |
| B32B 7/02 | (2006.01) |
| B29C 47/06 | (2006.01) |
| B29C 47/14 | (2006.01) |
| B32B 27/08 | (2006.01) |

(52) U.S. Cl.
CPC ............... B32B 7/02 (2013.01); B29C 47/0021 (2013.01); B29C 47/065 (2013.01); B29C 47/145 (2013.01); B32B 27/08 (2013.01); B32B 27/32 (2013.01)
USPC .......................................... 428/516; 428/515

(58) Field of Classification Search
USPC .................................................. 428/515, 516
See application file for complete search history.

(56) References Cited

U.S. PATENT DOCUMENTS

| | | | | |
|---|---|---|---|---|
| 4,289,831 | A * | 9/1981 | Last | 428/515 |
| 5,284,741 | A * | 2/1994 | Tachibana et al. | 430/529 |
| 5,576,038 | A * | 11/1996 | Moore et al. | 426/127 |
| 7,063,882 | B2 * | 6/2006 | Mossbrook et al. | 428/203 |
| 2002/0182390 | A1* | 12/2002 | Migliorini et al. | 428/216 |
| 2004/0084803 | A1* | 5/2004 | Bonke | 264/173.14 |
| 2005/0100820 | A1* | 5/2005 | Satake et al. | 430/271.1 |
| 2006/0188678 | A1* | 8/2006 | Ohlsson et al. | 428/35.7 |
| 2008/0057238 | A1* | 3/2008 | Follestad et al. | 428/35.2 |
| 2008/0311261 | A1* | 12/2008 | Gullick | 426/411 |

FOREIGN PATENT DOCUMENTS

WO WO 2006/004897 A1 1/2006

OTHER PUBLICATIONS

First Office Action issued in corresponding Chinese Patent Application No. 200810170609.8, mailed Dec. 13, 2010.

* cited by examiner

Primary Examiner — Ronak Patel
(74) Attorney, Agent, or Firm — Brinks Gilson & Lione

(57) ABSTRACT

Disclosed is a surface protective film, a method for fabricating the same, and pouch, and a method for fabricating the same. The surface protective film includes a stack of films including a middle layer, and a first skin layer and a second skin layer on opposite sides of the middle layer, wherein at least one of the first skin layer and the second skin layer is formed of a resin having a hardness lower than a hardness of a surface to be protected by the surface protective film, and the middle layer is formed of a resin including high density polyethylene, thereby permitting protection of a display surface without formation of scratch at a very low cost compared to the related art without aging and with slip.

8 Claims, 1 Drawing Sheet

SURFACE PROTECTIVE FILM, METHOD FOR FABRICATING THE SAME, POUCH THEREOF AND METHOD FOR FABRICATING THE SAME

RELATED APPLICATIONS

This application claims the benefit of the Patent Korean Application No. P2007-105653, filed on Oct. 19, 2007, which is hereby incorporated by reference as if fully set forth herein.

BACKGROUND OF THE INVENTION

1. Field of the Invention

The present invention relates to a surface protective film, method for fabricating the same, and pouch thereof, and method for fabricating the same, and more particularly, to a surface protective film for protecting a surface of an electronic product, such as a liquid crystal display device LCD, a Brownian tube CRT, a PDP, and so on, and a method for fabricating the same, a pouch thereof, and a method for fabricating the same.

2. Discussion of the Related Art

A protective film is applied to a surface of a display portion of various display devices, such as a liquid crystal display device LCD, a Brownian tube CRT, the PDP, and so on, or the display devices are conserved in pouches of the surface protective film. It is required that the surface protective film is not contaminated with dust or foreign matters during production, storage, and transportation, and the surface of the display device having the protective film applied thereto has no scratch formed thereon by foreign matters.

There are, for an example, surface protective films of a polymer film having adhesion paste applied thereto, and Polyethylene Terephthalate PET films having hard coating applied thereto.

However, the inventors discover a problem in that the surface protective film of the polymer film having the adhesion paste applied thereto contaminates the display surface due to the adhesion paste transferred to the display surface.

Moreover, the inventors discover a problem in that the surface protective film of the Polyethylene Terephthalate PET film having hard coating applied thereto causes so called a pol-dirty phenomenon in which the foreign matters causes scratches on the display surface in a case the foreign matters are present between the protective film and the display surface because the protective film has hardness similar to the display surface.

In order to make the related art protective film slippery, a slippery agent and anti-blocking agent is applied to an outermost layer of the film to make the film embossed.

However, the inventors discover a problem in that the protective film having the additive applied thus causes migration of the additives as time passes to, form wrinkles and change of physical properties of the film, such as a slipping property.

SUMMARY

A surface protective film includes a stack of films including a middle layer, and a first skin layer and a second skin layer on opposite sides of the middle layer, wherein one or both of the first skin layer and the second skin layer is formed of resin having a hardness lower than the hardness of a surface to be protected by the surface protective film, and the middle layer is formed of resin including high density polyethylene.

In another aspect, a method for fabricating a surface protective film includes the step of coextrusion of resins to form a three layered stacked film, wherein the stacked film includes a middle layer, and a first skin layer and a second skin layer on opposite sides of the middle layer, and both or one of the first skin layer and the second skin layer is formed of resin having hardness lower than hardness of a surface to be protected by the surface protective film, and the middle layer is formed of resin including high density polyethylene.

In another aspect, a pouch is constructed of the surface protective film.

In another aspect, a method for fabricating a pouch includes the steps of a first step for laminating the gas barrier on a substrate film, a second step for laminating a surface protective film on the substrate film and the gas barrier layer laminated in the first step, and a third step for fabricating a pouch by using a film laminated in the second step.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
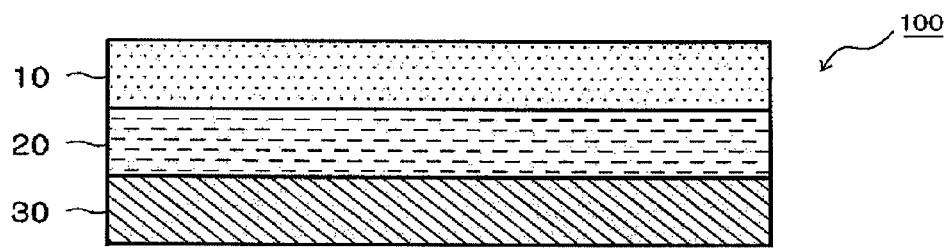
FIG. 1 illustrates a section of a surface protective film in accordance with a preferred embodiment of the present invention, schematically.

FIG. 1 illustrates a section of a surface protective film in accordance with a preferred embodiment of the present invention, schematically.

Referring to FIG. 1, the surface protective film 100 includes a first skin layer 10, an intermediate layer 20, and a second skin layer 30 stacked in succession.

Both or one of the first skin layer 10 and the second skin layer 30 is a layer which is to be in contact with a display surface, such as a polarizing plate, i.e., a protected surface to be protected by the surface protective film, and is formed of a soft resin having hardness (for an example, A hardness of about that of a pencil #2~3H) lower than hardness of the protected surface.

Thus, by forming the skin layer which is to be in contact with the protected film, the surface protective film is to protect, of a resin having hardness lower than the hardness of the protected surface, absorption of an impact is possible to prevent a scratch from forming.

The soft resin is at least one of groups selected from polyethylene group resin, polypropylene group resin, polyethylene terephthalate group resin, polyvinylalcohol group resin, nylon group resin, polyacrylonitrile group resin, polymethacryl acid group resin, having hardness which meets the required hardness.

In this instance, it is preferable that, of the soft resin, the polyethylene group resin is used, taking surface damage, and contamination prevention, i.e., the surface protection, into account.

As the polyethylene group resin, at least one of groups selected from low density polyethylene, medium density polyethylene, high density polyethylene, linear low density polyethylene, ethylene-vinyl acetate copolymer, ethylene-methacryl acid copolymer, and variant thereof.

The middle layer 20 is a resin layer including the high density polyethylene. The high density polyethylene provides stiffness to the protective film for easy working.

It is preferable that the middle layer 20 consists of, for an example, 20~80 wt % of the linear low density polyethylene, or the medium density polyethylene, and 20~80 wt % of the high density polyethylene.

Particularly, if a content of the high density polyethylene is higher than 20 wt %, the stiffness of the surface protective film is good. If the content of the high density polyethylene exceeds 80 wt %, much of oxide catalyst of organometal, chromium, vanadium, and molybdenum added in formation of the high density polyethylene escapes to the skin layer, resulting in, not only change of physical properties of the film, but also increase of a cost.

Therefore, if the stiffness is taken into account, it is preferable that the content of the high density polyethylene is limited to be below 80 wt % taking the change of physical properties of the film, and the increase of the cost, though the content of the high density polyethylene is 20 wt %, preferably 80 wt %.

The middle layer 20 may have antioxidant added thereto for improving thermal stability, processing stability, and a lifetime.

For an example, if the middle layer 20 is formed of the polyethylene group resin, the antioxidant may be added in a range of about 200~1500 ppm. An amount of the antioxidant added thus depends on a kind of resin. As the antioxidant, it is preferable that phenol group antioxidant or phosphor group antioxidant is used.

The surface protective film 100 is fabricated as a three layered stacked film by coextrusion of the layers. The surface protective film 100 fabricated thus, not only has excellent stiffness, processability, thermal stability, anti-solvent property, antistatic property, and so on, but also can minimize surface damage liable to take place in transportation, storage, and processing of display, such as the polarizing plate, or scratch liable to take place by surface contamination with external dusts, and so on.

It is preferable that the surface protective film 100 has a thickness of about 20~200 μm, and more preferably about 50~100 μm.

If the surface protective film 100 has a thickness less than 20 μm, handling of the film at the time of working (attaching the film to the display surface) will be poor. Opposite to this, if the surface protective film 100 has a thickness greater than 100 μm, the cost will rise unnecessarily.

Figure 2:
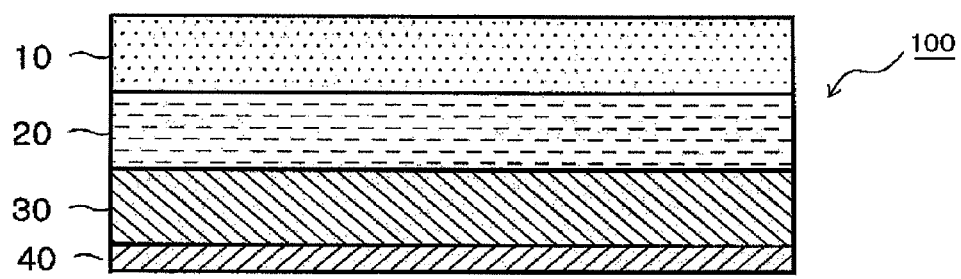
FIG. 2 illustrates a section of a surface protective film in accordance with another preferred embodiment of the present invention, schematically.

FIG. 2 illustrates a section of a surface protective film in accordance with another preferred embodiment of the present invention, schematically.

Referring to FIG. 2, the surface protective film in accordance with another embodiment of the present invention is the same as the surface protective film in accordance with the embodiment of the present invention described before, except that an antistatic fluid is coated to one of the skin layers to form an antistatic layer 40. In this instance, the antistatic layer 40 is formed on the skin layer opposite to the skin layer which is to be in contact with the protected surface so that the antistatic fluid is not transferred to the protected surface.

Basically, the antistatic fluid provides an antistatic property for preventing sticking of the foreign matters during transportation, and it is preferable that 0.01~5 wt % of ammonium salt dissolved in 95~99.99 wt % of solvent is used as the antistatic fluid.

If the ammonium salt is below 0.01 wt %, a desired surface resistance (antistatic property) can not be achieved, and if the ammonium salt is over 5 wt %, the cost rises without improvement of the antistatic property.

It is preferable that the ammonium salt is at least one selected from ammonium nitrate, ammonium chloride, ammonium carbonate, ammonium hydroxide, ammonium phosphate, and ammonium sulfate, and as the solvent, it is preferable that alcohol group solvent, such as methyl alcohol, isoprophyl alcohol IPA, isobutyl alcohol, isopentyl alcohol, and so on is used.

In formation of the antistatic layer 40, preferably, a surface of the skin layer whereon the antistatic fluid is to be coated is corona treated, to make a surface tension to be greater than 38 dyne.

Thus, the antistatic coating layer of the ammonium group antistatic fluid is applied to the skin layer opposite to the skin layer which is to be in contact with the protected surface. Eventually, the surface protective film can minimize surface damage liable to take place in transportation, storage, and processing of display, such as the polarizing plate, or scratch liable to take place by surface contamination with external dusts, and so on, and can prevent aging of physical properties, such as slipping property while satisfying the slipping property.

In the meantime, in order to prevent the pol-dirty phenomenon from taking place at the protected surface as additives, such as antioxidant, antiblocking agent, slipping agent, antistatic agent added to the skin layer of the surface protective film 100 in contact with the protected surface comes to an outermost surface of the skin layer as the time goes by, no additive is added to the skin layer to be in contact with the protected layer, but a skin layer only of the resin itself is formed.

The surface protective film of the present invention can be applied to the protected surface of monitors, or TV sets for itself, or a substrate film may be stacked on the surface protective film to form a pouch shape.

Figure 3:
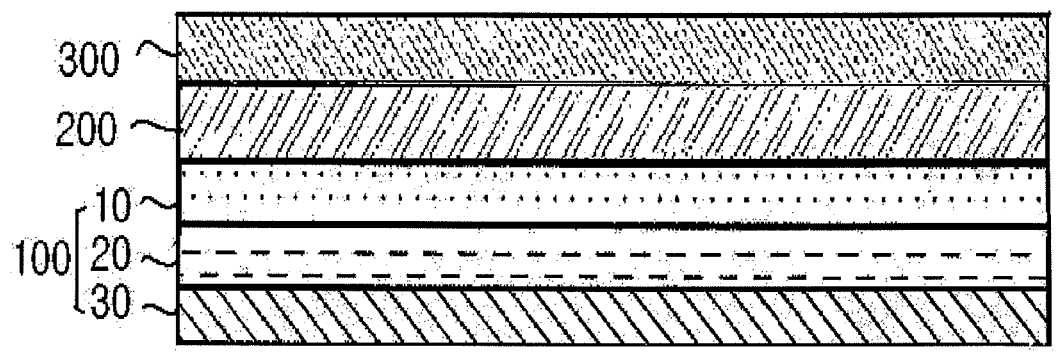
FIG. 3 illustrates a section of a pouch having a surface protective film at a bottom layer in accordance with a preferred embodiment of the present invention, schematically.

FIG. 3 illustrates a section of a pouch having a surface protective film at an inner most layer in accordance with an embodiment of the present invention, schematically.

Referring to FIG. 3, the pouch includes a stack of a substrate film 300, a gas barrier layer, and a surface protective film 100 wherein the surface protective film 100 is positioned at a bottom layer of the pouch.

As the substrate film 300, for an example, a polyethylene terephthalate film, a nylon film, or a polyolefin resin film, having an antistatic layer formed on an outermost layer is used.

The gas barrier layer 200 is constructed of, for an example, an aluminum film.

As described before, the surface protective film 100 is a three layered stacked film, or having the antistatic layer formed thereon.

In order to fabricate the pouch, for an example, after lamination of the substrate film 300 and the gas barrier layer 200, the surface protective film 100 is laminated on the substrate film 300 and the gas barrier layer 200 laminated thus again, to form a stack of films, one sheet of the stack of films is placed on another, and three edges are sealed, to form a pouch. In the lamination, it is preferable that a urethane resin, or acryl group resin is used as an adhesion paste.

Even if a display panel, such as a polarization plate is placed in the pouch, the pouch fabricated thus prevents a surface of the display panel from contaminating with foreign matters, or from forming scratch. Moreover, the gas barrier layer of the pouch makes an excellent shielding against moisture and oxygen, and prevents a light from transmitting during storage. Furthermore, an antistatic function of the pouch prevents dusts formed by friction, or foreign matters from infiltrating.

The following embodiments and comparative examples are provided only for comparative purposes.

Embodiment 1

Referring to FIG. 1, the surface protective film includes a first skin layer of a linear low density polyethylene singly, a middle layer of mixed resin of the linear low density polyethylene and a high density polyethylene (with 1:1 wt ratio of the linear low density polyethylene to the high density polyethylene), and a second skin layer of the linear low density polyethylene singly. In this instance, an entire thickness of the surface protective film is 80 μm.

Referring to FIG. 2, an antistatic fluid of 1 wt % of ammonium nitrate dissolved in 99 wt % of isopropyl alcohol is applied to the second skin layer which is not in contact with the protected film.

Comparative Example 1

Comparative example 1 is identical to the first embodiment except the antistatic coating. That is, a conductive polymer fluid PEDOT is applied to the second skin layer (a skin layer which is not in contact with the protected film) of the film of the first embodiment as the antistatic layer.

Comparative Example 2

Comparative example 2 is identical to the first embodiment except the antistatic coating. That is, an antistatic agent of a composite of a fatty acid ester group and an amine derivative is added to the second skin layer (a skin layer which is not in contact with the protected film), and coextruded to form the surface protective film.

Comparative Example 3

A UV beam is directed to a polyethylene terephthalate film to form a hard coating layer (acryl monomer).

<Experiment 1: Stiffness Measurement>

When the worker provides a surface protective film of a display surface size and fixing the film to the display surface with a tape, stiffness of the film is required for easy handling. Accordingly, it is required to provide hardness to the middle layer except the skin layer which is in contact with the display surface. For this, an experiment is carried out while a content of the high density polyethylene is adjusted for the film of the embodiment 1.

The experiment is carried out with a test piece cut from 10 mm bar loaded on a stiffness tester, to obtain a result as shown in the following table 1.

TABLE 1

| | LLDPE (wt %) | HDPE (wt %) | stiffness TD | stiffness MD |
|---|---|---|---|---|
| 1 | 90 | 10 | 6.8 | 9.0 |
| 2 | 80 | 20 | 15.7 | 13.5 |
| 3 | 70 | 30 | 21.8 | 16.8 |
| 4 | 60 | 40 | 30.2 | 17.3 |
| 5 | 50 | 50 | 41.8 | 21.5 |
| 6 | 40 | 60 | 45.7 | 25.2 |
| 7 | 30 | 70 | 49.5 | 28.9 |
| 8 | 20 | 80 | 57.2 | 32.1 |

In table 1, the greater the numerical value, the higher the stiffness, wherein the stiffness is comparatively good if the stiffness is higher than 15 in a TD direction, and the stiffness is excellent if the stiffness is higher than 40 in the TD direction.

<Experiment 2: Antistatic Property Measurement>

According to ASTM-D257, the antistatic property is measured by measuring surface resistance with an SRM-110 of the Wolfgang Warmbier.

A result of the measurement is shown in table 2. For reference, it is required to manage the surface resistance (unit: $\Omega$) to be below $10^{12}$ for preventing the foreign matters and the dusts for sticking by friction and improving processability.

<Experiment 3: Pol-Dirty Measurement>

Pol-dirty means transfer of a component of the surface protective film used for protecting a surface to the display surface, or formation of scratch on, or sticking of the foreign matters to, the display surface. Liability of the pol-dirty to take place is tested as follows.

After making random vibration of the surface protective film applied to the display surface for 60 minutes with a vibration tester with a model name CV-700 from IMV Co, Japan, existence of the scratch on the film and the display surface is inspected. A frequency range of the vibration is 2~2000 HZ with a maximum amplitude of 51 mm. 1000 800 mm×500 mm size samples are measured, to obtain a result as shown in a table 2.

<Experiment 4: Pencil Hardness Measurement>

After cutting the film to a size of 10 mm×10 mm, pencil hardness is measured with a pencil hardness tester according to ASTM-D3363. The pencil hardness ranges from 4B to 4H, and table 2 shows a result of the measurement.

<Experiment 5: Slip Measurement>

Since it is required that a roll of the surface protective film shows no blocking, the surface protective film is required to have a slipping property. In order to measure this, the slipping property of the film cut in an MD direction (a length direction) is tested with a CEAST DIGITAL SLIP TESTER CODE 6796/000 according to ASTM-D1894. The samples having sizes 120×250 mm, and 75×100 mm are prepared, and then the larger size sample is fixed, the smaller sample is placed on the larger size sample, a 200 g SLED is placed thereon carefully, and a friction coefficient is measured. A result of the measurement is shown in the table 2.

TABLE 2

|  | Antistatic property | | Pol-dirty | Pencil hardness | slip | |
|---|---|---|---|---|---|---|
|  | process | 10 days after |  |  | Initial measurement | Measurement after 8 hours |
| Embodiment 1 | $10^9$ | $10^9$ | No | Unable to measure | 0.41 | 0.41 |
| Comparative example 1 | $10^9$ | $10^9$ | Yes | Unable to measure | 0.55 | 1.51 |
| Comparative example 2 | $10^{11}$ | $10^{13}$ | Yes | Unable to measure | 0.42 | 2.64 |
| Comparative example 3 | $10^{15}$ | $10^9$ | Yes | 3H | 0.32 | 0.89 |

As can be known from the table 2, different from the embodiment 1, the comparative example 1 in which the conductive polymer fluid PEDOT is applied to the second skin layer, and the comparative example 2 in which an antistatic agent is put in the skin layer have pol-dirty taken place thereon. The comparative example 3 also has pol-dirty taken place thereon due to great hardness. For reference, pencil hardness of the polarization plate is 2.5H. The 'unable to measure' in the pencil hardness measurement means that the pencil hardness is unable to measure as the film has hardness lower than 4B pencil which is the softest resulting in tearing of the film or bitten off.

Moreover, as can be known form aging of slip in cases of the comparative examples 1 and 2, the comparative examples 1 and 2 show that the slip increases as the antistatic agent or additives of the antistatic fluid migrate to the skin layer in contact with the display surface the surface protective film is protecting.

<Experiment 7: Slip Measurement>

Pol-dirty phenomenon is identified while varying the content of the high density polyethylene in the surface protective film in accordance with the first preferred embodiment of the present invention. Pol-dirty phenomenon is identified by a method identical to the experiment 3 with 10,000 samples of the surface protective film after 500 hours passed at a temperature 60° C. and 70% humidity.

As a result of the measurement, the pol-dirty phenomenon of the surface protective film in the vicinity of the high density polyethylene content of 80 wt % is identified.

TABLE 3

|  | LLDPE (wt %) | HDPE (wt %) | Pol-dirty phenomenon |
|---|---|---|---|
| 1 | 23 | 77 | No |
| 2 | 22 | 78 | No |
| 3 | 21 | 79 | No |
| 4 | 20 | 80 | No |
| 5 | 18 | 82 | Yes |
| 6 | 17 | 83 | Yes |
| 7 | 15 | 85 | Yes |
| 8 | 10 | 90 | Yes |

As shown in table 3, though no pol-dirty phenomenon is taken place up to 80 wt % of the high density polyethylene content, pol-dirty phenomenon is taken place when the content of the high density polyethylene exceeds 80 wt %.

As has been described, the surface protective film, the method for fabricating the same, and the pouch thereof, and the method for fabricating the same of the present invention have the following advantages.

The surface protective film of the present invention prevents contamination caused by an impact or foreign matters, and scratches due to the contamination, to protect the display surface effectively, and has a very low cost, and no aging of slipping property or formation of wrinkles.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A surface protective film for an electronic device having polarizer comprising:
   a substrate film; a gas barrier layer on the substrate film; a stack of 3 layers; and
   an antistatic layer including 0.01~0.05 wt % of ammonium salt dissolved in 99.95~99.99 wt % of solvent, wherein the solvent is selected from the group consisting of methyl alcohol, isoprophyl alcohol, isobutyl alcohol and isopentyl alcohol,
   the stack comprising:
      a middle layer; and a first skin layer and a second skin layer on opposite sides of the middle layer and in direct contact with the middle layer,
   wherein at least one of the first skin layer and the second skin layer is formed of a resin having hardness lower than a hardness of a surface to be protected by the surface protective film, the middle layer comprises a resin including 77~80 wt % of high density polyethylene, and the middle layer further comprises 23~20 wt % of linear low density polyethylene, and
   wherein no additive is added to the first skin layer to be in contact with the surface to be protected, and
   wherein the antistatic layer is under the second skin layer and does not contact the surface to be protected for preventing aging of slipping property of the surface protective film; and
   wherein the ammonium salt is at least one selected from the group consisting of ammonium nitrate, ammonium carbonate and ammonium hydroxide.

2. The surface protective film as claimed in claim 1, wherein the skin layer is formed of at least one selected from the group consisting of polyethylene group resin, polypropylene group resin, polyethylene terephthalate group resin, polyvinylalcohol group resin, nylon group resin, polyacrylonitrile group resin, and polymethacryl acid group resin.

3. The surface protective film as claimed in claim 1, wherein the skin layer is formed of polyethylene group resin, and the polyethylene group resin is at least one selected from the group consisting low density polyethylene, medium density polyethylene, high density polyethylene, linear low density polyethylene, ethylene-vinyl acetate copolymer, ethylene-methacryl acid copolymer, and variant thereof.

4. The surface protective film as claimed in claim 3, wherein the skin layer is formed of linear low density polyethylene or medium density polyethylene singly.

5. The surface protective film as claimed in claim 1, wherein the skin layer is formed of linear low density polyethylene, or medium density polyethylene singly.

6. The surface protective film as claimed in claim 1, wherein the skin layer is formed of a resin having a hardness below 2.5H pencil hardness.

7. The surface protective film as claimed in claim 1, wherein the middle layer further includes an antioxidant.

8. A pouch for an electronic device having polarizer, comprising:
a substrate film;
a gas barrier layer on the substrate film;
a stack of 3 layers on the gas barrier layer; and
an antistatic layer, wherein the antistatic layer is formed of 0.01~0.05 wt % of ammonium salt dissolved in 99.91~99.95 wt % of solvent, wherein the solvent is selected from the group consisting of methyl alcohol, isoprophyl alcohol, isobutyl alcohol and isopentyl alcohol,
the stack of 3 layers including:
a middle layer; and
a first skin layer and a second skin layer on opposite sides of the middle layer and in direct contact with the middle layer, wherein at least one of the first skin layer and the second skin layer is formed of resin having a hardness lower than a hardness of a surface to be protected by the surface protective film, the middle layer comprises a resin including 77~80 wt % of high density polyethylene, and the middle layer further comprises 23~20 wt % of linear low density polyethylene, no additive is added to the first skin layer to be in contact with the surface to be protected for preventing aging of slipping property of the surface protective film;
wherein the antistatic layer is on the second skin layer and does not contact the surface to be protected for preventing aging of slipping property of the stack of 3 layers; and
wherein the ammonium salt is at least one selected from the group consisting of ammonium nitrate, ammonium carbonate, and ammonium hydroxide.

* * * * *